Jan. 6, 1942.     R. T. SHIRAISHI     2,268,966
ANIMAL TRAP
Filed Nov. 4, 1940
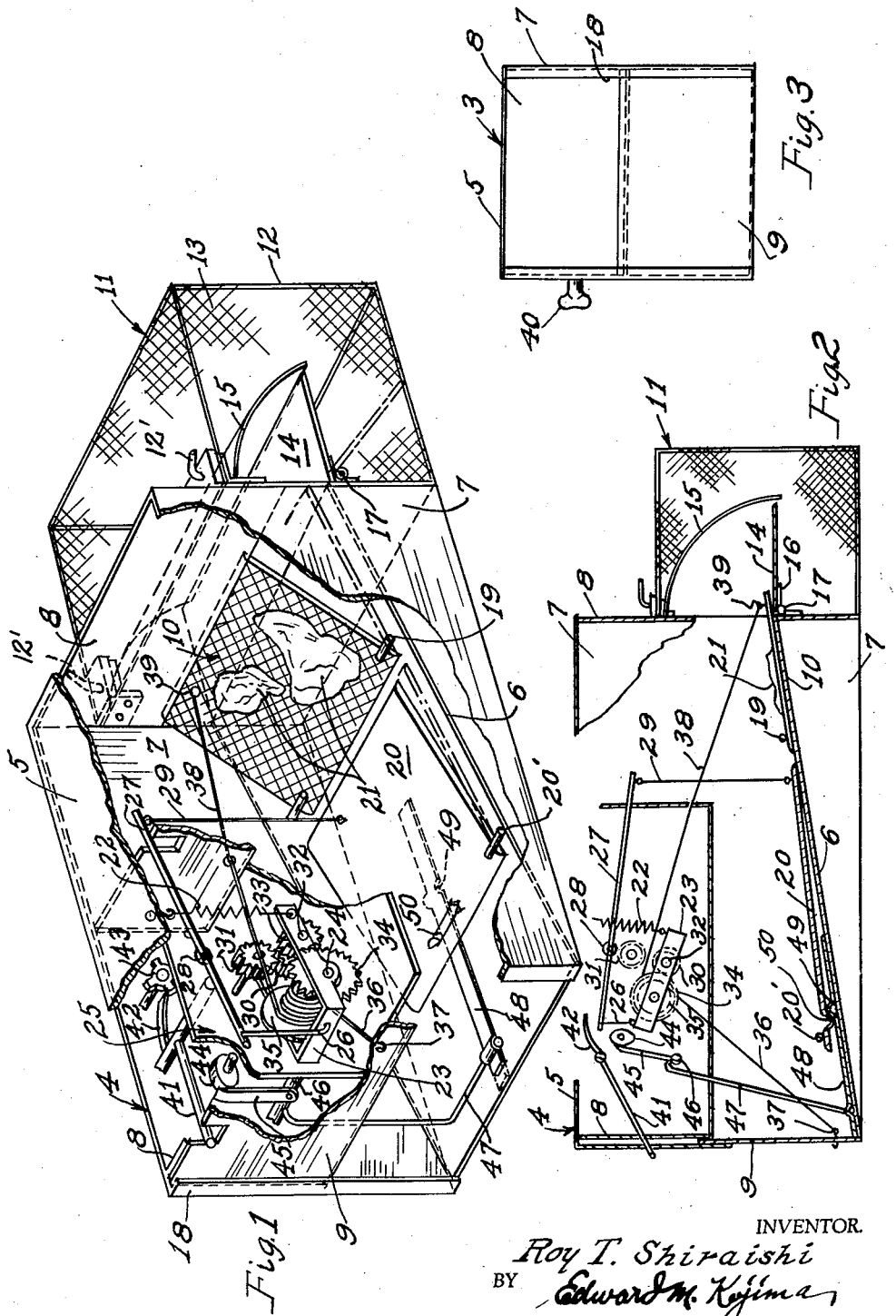
INVENTOR.
Roy T. Shiraishi
BY Edward M. Kojima
ATTORNEY.

Patented Jan. 6, 1942

2,268,966

UNITED STATES PATENT OFFICE 2,268,966

ANIMAL TRAP

Roy T. Shiraishi, Wilmington, Calif.

Application November 4, 1940, Serial No. 364,280

4 Claims. (Cl. 43—73)

My invention relates to improvement in animal traps and has for its primary purpose the provision of a new and highly efficient trap especially designed for trapping rodents, and which will be automatically reset upon the trapping of each rodent whereby when once baited and set it will be subject to continuous operation of long periods of time, for example, one or more days, without requiring attention or manual adjustment or operation of any kind during such periods of time.

One of the purposes of my invention is to provide a trap of the character described in which a novel and especially positioned noise-making device is actuated by the spring motor of the trap, whereby to frighten the rodent in such manner that it will run away from the entrance of the trap through the bait chamber and into a separate cage.

In the drawing:

Fig. 1 is a fragmentary perspective view partly schematic and showing the trap embodying my invention and as when set for continuous operation over a period of time equal to the duration of operation of a given spring motor;

Fig. 2 is fragmentary semi-schematic longitudinal sectional view of the trap of my invention as when a rodent has by its weight depressed the trigger plate and caused the entrance door and the outlet door of the bait chamber to respectively gravitate into closed and open positions, and also showing how the noise making means strikes the trigger plate and entrance door to frighten the mouse away from the entrance and into the cage; and Fig. 3 is a front elevation of the trap as when the entrance door is closed.

Referring more specifically to the drawing, the present embodiment of my invention comprises generally a receptacle having top, bottom, side and end walls 5, 6, 7, and 8 respectively, which define a bait chamber. In the walls 8 are entrance and exit doors 9 and 10 respectively, the latter of which affords the passage of rodents from said chamber into a cage 11.

The cage may be made of a suitable frame 12 covered with wire mesh 13 or may take any other box-like form and is provided with a trap door 14 and hood 15 arranged so that when the rodent passes through the exit of the bait chamber it will run onto the trap door which will open under the weight of and thereby cause the rodent to drop into the cage. The trap door is normally closed and returned to closed position by means of a light spring 16 associated with the hinge 17, trap door and adjacent end wall 8 as seen in Fig. 2. The hood 15 in the cage prevents the caged rodents from climbing from the cage back onto the door. The cage is detachably secured to the receptacle 3 by means of the withdrawable pins 12', and may have an openable side on wall not shown, for removing the trapped animals, or if desired the animal may be drowned in the cage and then removed through the trap door or otherwise.

The entrance door 9 is vertically slidable in guides 18 on the front end, wall 8 and is open when raised and adapted to gravitate to closed position. The exit door 10 is pivoted to the side walls by means of the trunnions 19 and is open when lowered and closed when raised. The bottom wall 6 is upwardly inclined from the entrance to the exit of the bait chamber and supports a trigger plate 20 pivoted to the side walls by means of trunnions 20' so that it is normally upwardly inclined towards the exit door and has the end contiguous thereto adapted to be depressed by the weight of an animal thereon.

When an animal such as a rodent enters the chamber, the entrance door 9 being then raised and open and the exit door 10 raised and closed as shown in Fig. 1, it is attracted toward the bait 21 placed or secured on the exit door which is rearwardly tilted or inclined when closed, and therefore runs up the trigger plate 20 and causes it to be depressed before running therefrom onto the exit door 10. This trigger plate is normally held elevated at its free end by means affording regulation of the spring to suit the trap to animals of different sizes. This spring is secured to a frame 23 pivoted at 24 between its ends on a spring motor or clockworks 25. One end of this frame is connected by a link 26 to a lever 27 pivoted at 28 on the spring motor and connected by means of a flexible element or link 29 with the free end of the trigger plate.

Thus when the trigger plate is depressed by the animal thereon, the link 29 is lowered and rocks the lever 27 so that it will through link 26 rock the frame 23 and thereby disengage the frame carried driven gear 30 from the spring motor operated drive gear 31 as indicated in Fig. 2. As gear 30 is fixed on shaft 32 on the frame 23 and a similar gear 33 is keyed to said shaft and meshes with a gear 34 fixed to a rotary drum 35 supported in the frame, it is seen that upon disengaging gear 30 from gear 31 the drum is free to rotate whereas it is held against rotation by the meshing of gears 30 and 31 when the latter is at rest. A cable 36 is wound to operate from the lower side of the drum and is connected as at 37 with the entrance door 9 whereas a similar cable 38 is wound to operate from the upper side of the drum and is connected with the exit door 10 as at 39. Thus when the drum is freed as aforesaid, the entrance door 9 will gravitate to closed position and the exit door 10 will gravitate to open position, substantially simultaneously, due to the rodent depressing the trigger plate, and the clockwise rotation of the drum slacking both cables. Assuming that the spring motor has been wound by the key 40 seen in Fig. 3, as soon as the entrance door 9 drops free of the lever 41 of the spring motor mechanism the latter gravitates and lifts the stop member 42 from the stop wheel 43 of the motor mechanism, and thereby starts the motor which at this time does not operate the drum due to the gear 30 being lowered from driving contact with the motor driving gear 31. However, as the motor operates it drives a cam 44 which rocks a crank arm 45 on rock shaft 46 and through a downwardly extending crank arm 47 reciprocates a noise making strip or bar 48. This bar 48 at one end strikes the entrance door 9 which is preferably sheet metal and thereby makes a noise which will frighten the animal and cause it to run away from the entrance and off of the trigger plate. This noise bar has a raised portion 49 adapted to strike a similar portion 50 on the trigger plate to make a noise on the plate at a point between the end portion of the plate and the entrance door to insure further frightening of the rodent so that it will run off the trigger over the lowered exit door and onto the trap door of the cage as pointed out herein before whereby to be dropped into and retained in the latter.

As soon as the rodent runs off the free end of the trigger plate, the spring 22 lifts the gear carrying end of the frame 23, and engages gear 30 with drive gear 31 then being turned by the spring motor. As the drive gear 31 is driven counterclockwise the gear 34 and drum 35 will be rotated counterclockwise whereby to wind up the cables 36 and 38 and simultaneously begin to raise and open the entrance door 9 and raise and close the exit door 10. As this door's moving operation takes place slowly due to the small diameter and slow speed of the drum, the rodent will have ample time to run over the door 10 onto the trap door of the cage before the exit door has been appreciably raised. Thus it is seen that as each animal is driven off the trigger plate and into the cage, the entrance door opens and the exit door closes whereby to automatically reset the trap. The operation hereinbefore described will repeat as long as the spring motor will operate and with a large spring such a motor will render the trap continuously operative for one or more days without rewinding or any other attention to the trap.

It will now be seen that the trap of this invention will operate to provide the objectives and advantages thereof in a highly satisfactory manner.

I claim:

1. In an animal trap a receptacle providing a bait chamber, an entrance door at one end of the chamber, an exit door at the other end of the chamber, a cage in which animals are trapped in passing through the exit door, said entrance door being arranged to be open when raised and to gravitate into closed position, said exit door being arranged to close when raised and to gravitate into open position, a trigger plate between said doors in position to be depressed by an animal which has entered the bait chamber, and operating means normally holding said doors in raised position whereby the entrance to the chamber is open and the exit is closed, and operating when the trigger plate is depressed to release both doors whereby to close the entrance and open the exit of the bait chamber subsequently operating when the animal runs off the trigger plate to raise both doors whereby to reset the trap and means operating responsive to the closing of the entrance door for making a noise between the animal and the entrance door whereby the animal will be frightened so that it will run through the bait chamber into said cage.

2. In an animal trap a receptacle providing a bait chamber, an entrance door at one end of the chamber, an exit door at the other end of the chamber, a cage in which animals are trapped in passing through the exit door, said entrance door being arranged to be open when raised and to gravitate into closed position, said exit door being arranged to close when raised and to gravitate into open position, a trigger plate between said doors in position to be depressed by an animal which has entered the bait chamber, and operating means normally holding said doors in raised position whereby the entrance to the chamber is open and the exit is closed, and operating when the trigger plate is depressed to release both doors whereby to close the entrance and open the exit of the bait chamber subsequently operating when the animal runs off the trigger plate to raise both doors whereby to reset the trap and means operating responsive to the closing of the entrance door for making a noise between the animal and the entrance door whereby the animal will be frightened so that it will run through the bait chamber into said cage, including a member which strikes said entrance door.

3. In an animal trap a receptacle providing a bait chamber, an entrance door at one end of the chamber, an exit door at the other end of the chamber, a cage in which animals are trapped in passing through the exit door, said entrance door being arranged to be open when raised and to gravitate into closed position, said exit door being arranged to close when raised and to gravitate into open position, a trigger plate between said doors in position to be depressed by an animal which has entered the bait chamber, and operating means normally holding said doors in raised position whereby the entrance to the chamber is open and the exit is closed, and operating when the trigger plate is depressed to release both doors whereby to close the entrance and open the exit of the bait chamber subsequently operating when the animal runs off the trigger plate to raise both doors whereby to reset the trap and means operating responsive to the closing of the entrance door for making a noise between the animal and the entrance door whereby the animal will be frightened so that it will run through the bait chamber into said cage including a striker adapted to intermittently strike the trigger plate.

4. In an animal trap a receptacle providing a bait chamber, an entrance door at one end of the chamber, an exit door at the other end of the chamber, a cage in which animals are trapped in passing through the exit door, said entrance door being arranged to be open when raised and to gravitate into closed position, said exit door being arranged to close when raised and to gravitate into open position, a trigger plate between said doors in position to be depressed by an animal which has entered the bait chamber, and operating means normally holding said doors in raised position whereby the entrance to the chamber is open and the exit is closed and operating when the trigger plate is depressed to release both doors whereby to close the entrance and open the exit of the bait chamber subsequently operating when the animal runs off the trigger plate to raise both doors whereby to reset the trap including a striker adapted to intermittently strike the trigger plate and the entrance door.

ROY T. SHIRAISHI.